US008892486B2

(12) United States Patent
Isaiadis (10) Patent No.: US 8,892,486 B2
(45) Date of Patent: Nov. 18, 2014

(54) PROCESSOR NODE, ARTIFICIAL NEURAL NETWORK AND METHOD OPERATION OF AN ARTIFICIAL NEURAL NETWORK

(75) Inventor: Stavros Isaiadis, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 13/348,130

(22) Filed: Jan. 11, 2012

(65) Prior Publication Data

US 2012/0215728 A1 Aug. 23, 2012

(30) Foreign Application Priority Data

Jan. 12, 2011 (EP) .................................... 11150739

(51) Int. Cl.
*G06N 3/02* (2006.01)
*G06N 3/08* (2006.01)
(52) U.S. Cl.
CPC ........................................ *G06N 3/08* (2013.01)
USPC .............................................. 706/25; 706/15
(58) Field of Classification Search
CPC .................................. G06N 3/02; G06N 3/08
USPC ....................................................... 706/15, 25
See application file for complete search history.

(56) References Cited

U.S. PATENT DOCUMENTS

| 5,175,794 | A | * | 12/1992 | Tattersall | 704/200 |
|---|---|---|---|---|---|
| 6,151,592 | A | * | 11/2000 | Inazumi | 706/16 |
| 2006/0106797 | A1 | * | 5/2006 | Srinivasa et al. | 707/6 |
| 2012/0036097 | A1 | * | 2/2012 | Prokhorov | 706/20 |

OTHER PUBLICATIONS

Simon Haykin, "Feedforward Neural Networks: An Introduction", Nonlinear Dynamical Systems: Feedforward Neural Network Perspectives, Jan. 2001, pp. 1-16.
M. Yousaf et al., "An Intelligent Prediction Model for Generating LGD Trigger of IEEE 802.21 MIH", Lecture Notes in Computer Science, vol. 5754/2009, 2009, pp. 413-422.
Simon Haykin, "Temporal Processing Using Feedforward Networks", Neural Networks: a Comprehensive Foundation, $2^{nd}$ Edition, Jul. 1998, pp. 635-663.

* cited by examiner

*Primary Examiner* — Jeffrey A Gaffin
*Assistant Examiner* — Dave Misir
(74) *Attorney, Agent, or Firm* — Staas & Halsey LLP (57) ABSTRACT

There is provided a temporal processor node for use as an input node in the input layer of a class network in an artificial neural network, the class network being operable to generate an output signal based on a network input vector component received by the input layer, the temporal processor node being operable to receive observation data representing the observed state of a monitored entity as a component of the network input vector. The temporal processor node comprises a memory module operable to store a most recently observed state of the monitored entity in the memory module as a current state, a modification module having a timer, the timer being operable to output a value representing time elapsed since observation of the current state, the modification module being operable to modify the current state with a modification factor dependent on the value output by the timer, wherein when triggered, the temporal processor node is operable to output the modified current state as a representation of the current state.

11 Claims, 5 Drawing Sheets

PROCESSOR NODE, ARTIFICIAL NEURAL NETWORK AND METHOD OPERATION OF AN ARTIFICIAL NEURAL NETWORK

This application claims the benefit of European Application No. 11150739.8, filed Jan. 12, 2011, the disclosure of which is incorporated herein by reference.

This invention is in the field of artificial neural networks, and relates in particular to the design and structure of the input layer of an artificial neural network. An artificial neural network may be used in pattern matching and other diagnostic procedures.

Artificial Neural Networks are being increasingly used to perform pattern matching in various domains, as well as complex diagnostic procedures in domains such as healthcare and computer network monitoring. In the context of diagnostic procedures, artificial neural networks are first trained to recognize a specific problem or set of problems, and then can determine instantaneously the existence or not of a problem with an acquired degree of confidence. However, temporal relationships in the diagnosis patterns are not being addressed adequately currently, even though they may play an important role in the diagnostic procedures in a number of fields.

Typically, an input node, or input neuron, in the input layer of an artificial neural network observes the state of a monitored entity and outputs a representation of the state when triggered. Outputting a state in this way can be referred to as 'firing'. Each time an input node in the artificial neural network fires, the remaining input nodes perform an observation of the state of their monitored entity and output a representation of that state to the next layer in the neural network.

For diagnostic procedures, an artificial neural network is trained through operation in a training mode to recognise complex patterns and identify problems and situations instantaneously based on the input vector (the collective term for the state observations received by the input layer). The development of procedures for training artificial neural networks is a complex inter-disciplinary field of research. The input vector provides a snapshot of the monitored entities at a particular instant in time. This has been very successful and helpful especially in domains such as healthcare, and policing/monitoring, where an artificial neural network is used to notify of the existence of a specific situation.

Artificial neural networks can also be used to diagnose problems outside the aforementioned domains, and are also prevalent in the IT domain, for example, for network administrative purposes. More specifically, artificial neural networks could be used for instant diagnosis of situations based on constant-size input vectors in distributed systems. In these, we assume that a constant number of monitored entities are present in the system (e.g. an enterprise-wide system of virtual servers with a specific number of reusable virtual machines, mirroring a thread pool arrangement in modern programming languages). Those entities, in turn, have a specific set of monitored properties, e.g. load, network delay, memory, etc. This complete system, can then be monitored using a steady size artificial neural network (e.g. in the Back Error Propagation (BEP) class of artificial neural networks in which training is performed via analysis of the contribution of each node to a resultant error and adjusted accordingly).

A common configuration of an artificial neural network is for the nodes to be divided into a number of class networks, each operable to perform a specific diagnosis or pattern-matching function. There may be some overlap between class networks in terms of shared nodes and shared inputs, but each class network may generate its own output signal.

During training, the artificial neural network, or a class network within the artificial neural network, will learn to recognize problematic situations, by correlating and matching the states of each property (of each node) to produce the desired error report. For example, the artificial neural network may correlate the two conditions:

IF "VIRTUAL MACHINE A CANNOT BE REACHED"
AND "APPLICATION A IS HUNG"

with the error report (desired outcome from the class network):

THEN "VIRTUAL MACHINE A IS DOWN".

Each time a status update is available, that is to say, each time the input node monitoring whether or not virtual machine A can be reached, or the input node monitoring whether or not virtual machine A is hung, identifies a change in state, each input node is triggered and 'fires' by outputting a representation of the current state of the monitored entity.

In Time Delayed Neural Networks, in which the network is to be adapted online, the input vector is continuous with multiple values in each input node that are delayed and fed to the network in specific time intervals. The goal of TDNNs is to work on continuous data and be able to recognize temporal associations in input sequences, understand and detect patterns in sequential input data, and predict past or future evolution of sequential patterns. TDNNs can recognise sequences in input data, i.e. that one input arrived after another. However, TDNNs cannot recognise temporal relationships such as elapsed time between input arrivals.

It is desirable to provide an artificial neural network in which time-sensitive inputs can be handled by the rules for modifying the input vector in the input layer.

Embodiments may include a temporal processor node for use as an input node in the input layer of a class network in an artificial neural network, the class network being operable to generate an output signal based on a network input vector component received by the input layer, the temporal processor node being operable to receive observation data representing the observed state of a monitored entity as a component of the network input vector, and comprising a memory module operable to store a most recently observed state of the monitored entity in the memory module as a current state a modification module having a timer, the timer being operable to output a value representing time elapsed since observation of the current state, the modification module being operable to modify the current state with a modification factor dependent on the value output by the timer, wherein when triggered, the temporal processor node is operable to output the modified current state as a representation of the current state.

Artificial neural networks are widely employed to perform pattern matching and diagnostic procedures. A typical structure of an artificial neural network is a three-layer structure, having an input layer at which observations are input to the network, a hidden or processing layer, at which further processing operations are carried out on information received from the input layer, and an output layer, at which an output signal is generated based on information received from the processing layer. Embodiments of the present invention primarily are concerned with the input layer and the nodes of which it is composed. The precise structure of the artificial neural network is not limited, neither are the specific functions of the layers beyond the input layer.

The temporal processor node may be realised in a hardware or software implementation. The observation of a monitored entity may be carried out by a sensor integral to the node, or the node may be operable to accept information from a sensor. Artificial neural networks can be realised as hardware- or software-based implementations, or as a mixture of hardware- and software-based entities. Training of class networks is performed as a software application, but the resulting trained class network could be produced in hardware when error is sufficiently low that re-training will not be required, and for near-zero recognition times.

Advantageously, the temporal processor node provides a member of the input layer of an artificial neural network which is time-sensitive. This provides an entirely novel way of treating time-sensitive input in the various diagnostic procedures carried out by an artificial neural network.

Optionally, the current state is a numerical value, and modifying the current state with a modification factor may be simply multiplying that numerical value by a weighting factor as a modification factor.

Embodiments may be realized as an artificial neural network having a class network, the class network operable to generate an output signal based on a network input vector received by an input layer of the class network, the class network comprising a plurality of input nodes forming the input layer, each input node having a memory module and being operable to receive observation data representing the observed state of a monitored entity as a component of the network input vector, to store a most recently observed state of the monitored entity in the memory module as a current state, and, when triggered, to output a representation of the current state. In such artificial neural networks one or more of the plurality of input nodes is a temporal processor node for use as an input node in the input layer of the class network in the artificial neural network, the temporal processor node being operable to receive observation data representing the observed state of a monitored entity as a component of the network input vector, and comprising a memory module operable to store a most recently observed state of the monitored entity in the memory module as a current state a modification module having a timer, the timer being operable to output a value representing time elapsed since observation of the current state, the modification module being operable to modify the current state with a modification factor dependent on the value output by the timer, wherein when triggered, the temporal processor node is operable to output the modified current state as a representation of the current state.

Advantageously, the inclusion of temporal processor nodes amongst the input nodes enables time-sensitive input to be considered in various diagnostic procedures.

It may be the case that the representation of the current state output by the input nodes other than the temporal processor nodes are modified versions of the current state store in the memory module, for example as a result of multiplication by a weighting factor. However, in the case of such input nodes, the modification is irrespective of time elapsed since observation of the current state.

Optionally, the class network is operable to function in a training mode, in which the input layer is operable to receive a training input vector as a network input vector with sample states of monitored entities as components for treatment as observed states of monitored entities in the input nodes, and each time a training input vector is received, each of the timers are reset, and the modification factor for each of a plurality of values of elapsed time is set for each temporal processor node.

Advantageously, the manner in which the time-sensitive inputs are handled in invention embodiments enables training of the class network to take place without special modifications and treatment of the time-sensitive input.

When operating in a training mode, the artificial neural network, and its particular class networks, seek to modify the way in which the nodes of the network modify and correlate input data. In general, a sample training input is used having an associated desired output. The class network is then subject to a training procedure which may, for example, analyse which nodes in the class network are sources of the error (difference between the desired outcome and the actual outcome), and modify the treatment of input data at those nodes.

The training procedure may be a backward error propagation procedure, in which the difference between the output signal generated by the class network as a result of the sample training input and a desired output signal is minimised by adapting the weighting factor or other modification process at each node of the class network based on the gradient of the error in the class network with respect to the adaptable weighting factors. It may be that the training procedure is also used to adapt weighting factors of input nodes other than temporal processor nodes. However, embodiments of the present invention are not limited by the particular training procedure employed.

Advantageously, no modification of existing training procedures is required to train a class network having temporal processor nodes, although the training mode of the class network must call on those training procedures in a novel manner.

Optionally, each time a training input vector is received the training procedure is performed with the timers of the one or more temporal processor nodes outputting an elapsed time of zero, and for the same training input vector, for each temporal processor node, the training procedure is performed with the timer of the temporal processor node outputting each of a plurality of values of elapsed time.

The order and timings at which nodes are addressed during training will depend on the particular implementation. This optional embodiment effectively uses, for each temporal processor node in the class network, an inner loop within a larger per-sample loop to train the node at a plurality of values of elapsed time. This technique provides a time and computationally efficient manner in which to train the temporal processor nodes.

Optionally, the class network is operable to function in a recognition mode, in which
when a component of the network input vector changes, the plurality of input nodes forming the input layer are triggered and are each operable to output a representation of the current state, and if the input node at which the received component of the network input vector has changed is a temporal processor node, the timer of that temporal processor node is reset.

Advantageously, in recognition mode the use of temporal processor nodes to handle time-sensitive inputs affects the overall decision making process of the class network.

Optionally, the artificial neural network also includes a processing layer including a plurality of processing nodes operable to receive one or more representations of current states from the input layer, and to combine and modify the received representations to output as a processed signal, and an output layer, operable to receive processed signals from one or more processing nodes and to combine and modify the received processed signals to output as the output signal.

The processing layer may be a single layer, or it may comprise several sub-layers, with a first sub-layer operable to receive information from the input layer, and to combine and modify the received representations to output as a processed signal to a subsequent sub-layer. The sub-layer in receipt of said processed signal may then combine and modify the received processed signal for output either to a further sub-layer, or to the output layer.

The processed signal can also be considered to be a vector composed of a plurality of components, one from each of a plurality of nodes. The combination and modification which occurs at each node may include selecting certain components of the received input vector or processed signal, combining said components numerically, and then modifying the result, possibly by multiplication by a weighting factor characteristic of the particular node. The weighting factor may be susceptible to modification itself during operation of the class network in a training mode.

The output signal may be a numerical value, a vector having a plurality of components, or simply a 1 or 0 binary bit, or any other output signal.

Optionally, the monitored entities whose states are observed belong to a system, and the class network is operable to generate a decision on whether or not a particular problem has occurred in the system based on the network input vector.

Advantageously, the use of temporal processor nodes in such a system enables time-sensitive inputs to be considered in the diagnosis or identification of problems in a system. The conditions which must be satisfied in the input vector for a problem to be identified may be time-dependent, eg, has entity A entered a failed state in the past 60 seconds? Use of a temporal processor node for observing the state of entity A enables such considerations to be taken into account at an input layer of the class network.

The artificial neural network may also include one or more additional class networks, each additional class network being operable to generate a decision on whether or not a different particular problem has occurred in the same system based on a network input vector.

It may be that a particular node, including a temporal processor node, in the artificial neural network can functionally participate in more than one class network, and as such there is some physical overlap between class networks, though they remain functionally distinct. Optionally, a One Class One Network artificial neural network configuration for diagnosing problems may be employed, with one class being a family of functions which can be used in a layer of the class network to detect a particular problem in a monitored system. Embodiments of the present invention are suited to the One Class One Network architecture, but are not limited by network architecture.

As will be appreciated by those skilled in the art, the question of how many neural networks to use for a particular problem is a design-level decision, and will depend on factors such as training time available, desired error confidences, number of inputs, and more. Typically, a One Class One Network architecture is quicker to train for a large number of inputs. It is also facilitates extension by adding another class to recognise without needing to retrain the entire neural network. The training processes associated with temporal processor nodes are well suited to a One Class One Network architecture.

In a further aspect there is a method for generating an output signal from a network input vector received by an input layer in a class network forming part of an artificial neural network, the class network comprising a plurality of input nodes forming the input layer, each input node having a memory module, wherein one or more of the input nodes are temporal processor nodes, each comprising a modification module having a timer. The method comprises at each of the input nodes, receiving observation data representing the observed state of a monitored entity as a component of the network input vector, and storing a most recently observed state of the monitored entity in the memory module as a current state, and, when triggered, outputting a representation of the current state. At each of the temporal processing nodes, the method further comprises outputting a value from the timer representing time elapsed since observation of the current state, modifying the current state with a modification factor dependent on the value output by the timer, and when triggered, outputting the modified current state as the representation of the current state.

The method may also include, in a training mode of the class network, inputting to the input layer as a network input vector, a training input vector with sample states of monitored entities for treatment as observed states of monitored entities in the input nodes, and for each training input vector, resetting each of the timers when the training sample is received, and for each of a plurality of values of elapsed time, performing a training procedure to define a modification factor for each temporal processor node.

The method may also include, in a recognition mode of the class network, when a component of the network input vector changes, triggering each of the plurality of input nodes forming the input layer to output a representation of the current state, and if the input node at which the received component of the network input vector has changed is a temporal processor node, resetting the timer.

A detailed description of embodiments of the present invention will now be presented, with reference to the appended Figures, in which.

Figure 1:
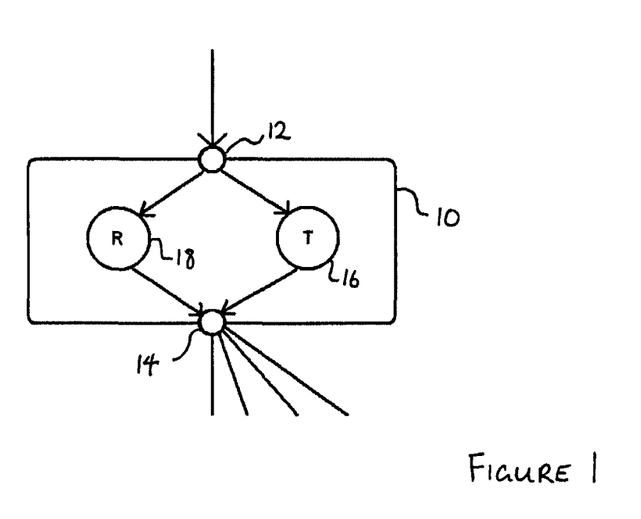
FIG. 1 is a schematic illustration of a temporal processor node of an embodiment.

The temporal processor node 10 illustrated schematically in FIG. 1 has an observation module 12, a modification module 14, a relay (which is an example of a memory module) 18, and a timer 16.

The observation module 12 accepts an input from a source which is either itself an observation of the state of a monitored entity, or can be used to generate an observation of the state of a monitored entity. The input is an observation of the state of a monitored entity. The observation module 12 may itself be a sensor, so that the input from a source is an environmental stimulus or property. The observation of the state of a monitored entity may be a value representing a single property of the monitored entity, and may be scaled so that all values of that property in the class network are, for example, between 0 and 1.

Alternatively, the observation module 12 may be operable to accept a signal from a sensor as an input. The input may be in the form required by the temporal processor node 10, or some modification of the input, such as A/D conversion, or codification of the input value is carried out within the observation module 12.

As a further alternative, the temporal processor node 10 may be used between an artificial neural network input node and the next layer, and the temporal processor node 10 may be in the input layer of a class network. In this case or otherwise, the observation module 12 may be operable to accept an output from another input node of the artificial neural network as an input.

The temporal processor node 10 can be attached to any input node (input neuron) for which the observed state of the monitored entity is affected by time with respect to the pattern matching or diagnosis being performed by the class network. The temporal processor node 10 is operable to alter the signal output by the input node according to time elapsed since the last change of the state being monitored.

Whether it be responsible for any modification of the input or otherwise, the observation generated by the observation module 12 is forwarded to the relay 18 and the timer 16. The relay 18 merely holds and forwards to the modification module 14 the most recently observed state of the monitored entity as a current state. The relay 18 may be a simple latch, a volatile or non-volatile memory, or it may be an area of a larger storage device, which is functionally part of the temporal processor node 10, though physically separate.

The timer 16 receives the observation of the state of the monitored entity from the observation module 12. The timer 16 is operable to output a value representing the time elapsed since observation of the current state of the monitored entity.

Embodiments are not limited in terms of the precise stimulus which will cause the timer to reset. In one embodiment, the timer may have a connection to the relay 18, so that each time a state of the monitored entity is received by the observation module 12, it is compared with the stored state in the relay 18, and if they are different then it is deemed that the state of the monitored entity has changed and a reset signal is sent to the timer 16. Such a reset stimulus may be suitable in embodiments in which the observation module periodically receives observed states, based on some system-wide configuration.

Alternatively, each observed state may be deemed to be an independent event, regardless of whether the state happens to have the same value as the state stored in the relay 18. The fact that a new observed state has been received is sufficient for it to be deemed new, and hence a reset instruction may be sent from the observation module 12 to the timer 16. For example, an observation 'server down' may happen to be the same as the previously observed state in a particular temporal processor node, but the 'server down' event may be new and independent of the previously stored state. This may be the case when observation of a state of the monitored entity is event-triggered. The timer 16 may well have a connection to an external clock signal, such as a system clock, so that the timer 16 is effectively a counter. Some or all of the temporal processor nodes 10 in a class network, or an entire artificial neural network, may be connected to the same external clock signal. The timer 16 is operable to output to the modification module 14 a value representing the time since the observation of the state of the monitored entity last changed.

The modification module 14 is operable to modify the observation of the state of the monitored entity received from the relay 18, that is, the most recent or current state, to generate and output a modified current state as a representation of the observed state in a class network in which the temporal processor node 10 is operating. The modification is dependent on the value received from the timer 16, that is to say, the modification is dependent on the time since the observation of the state of the monitored entity last changed.

The nature of the modification performed by the modification module 14 will depend on the particular implementation in which the embodiment is operating. It may include multiplication of the value of the observation of the state of the monitored entity by a weighting factor. The modification is dependent on the value from the timer, so the weighting factor may change according to the value received from the timer. In this way, the temporal processor node is operable to emulate the effect of the passage of time on the output of an input node. Hence, the modification module 14 may store a list of timer values and modifications, or there may be a function based on the timer value which generates a modification. The modifications, such as weighting factors, are adaptable during a training mode of the class network in which the temporal processor node 10 is operating, but may remain fixed in an ordinary operation or recognition mode.

The use of a temporal processor node 10 enables time-sensitive elements to be taken into account in diagnostic procedures. Temporal relationships may point to completely different problems than if time was not taken into account. For example, consider the problematic situation:

IF "NETWORK A IS SLOW" AND
"THERE WAS AN APPLICATION FAILURE WITHIN THE LAST TWO MINUTES"
THEN
INITIATE "DIAGNOSTIC PROCEDURE A" AND NOTIFY "ADMIN B"

The temporal processor node 10 enables such conditions to be considered. The modification module 14 may be operable to modify the observation of the state of the monitored entity such that outside of the first two minutes since the change of state, a weighting factor of 0 is applied and it is effectively not reported. The modification module 14 may use a time-dependent mathematical function to control how the observation of the state of the monitored entity received from the relay 18 is modified. The details and profile of that mathematical function are set during training, perhaps from a random initial function, and could be a window function, a steadily decreasing linear or non-linear function, or could be in any other form.

Optionally, the temporal processor node 10 may also be operable to output the observation of the state of the monitored entity to the next layer directly from the relay 16 without modification by the modification module 14.

Figure 2:
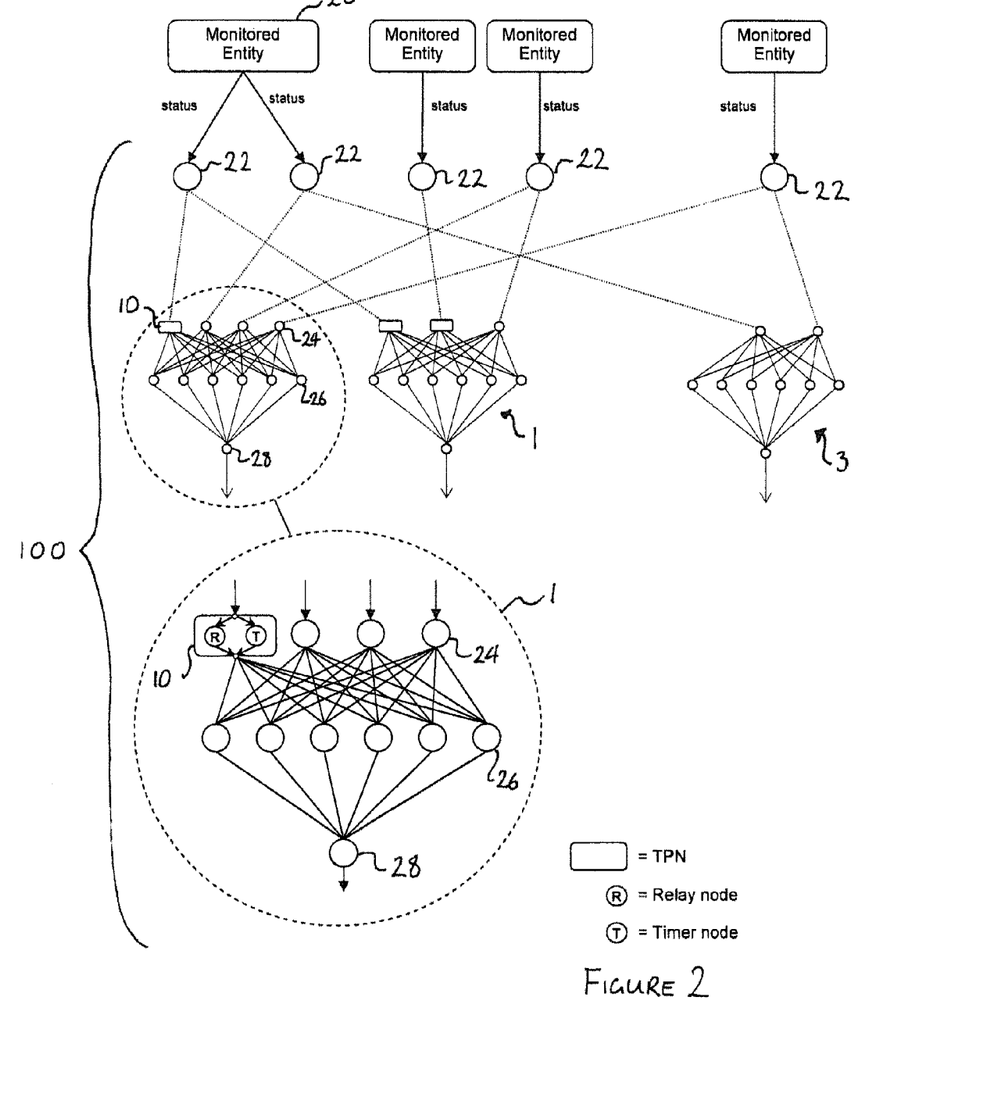
FIG. 2 is a schematic illustration of an artificial neural network of an embodiment.

FIG. 2 is a schematic illustration of an artificial neural network 100, and a system of monitored entities 20.

The artificial neural network 100 comprises a number of class networks, including class networks 1 with temporal processor nodes 10, and class networks 3 without temporal processor nodes.

A class network 1 is shown enlarged, in which the three layer structure of this particular embodiment can be seen. The first layer is an input layer comprising input nodes 24, of which some are temporal processor nodes 10. In this embodiment, each input node of the input layer of the class network accepts an input from another node 22 in the artificial neural network, the other nodes 22 not forming part of the particular class network 1. Of course, this additional layer of nodes 22 is optional, and the input nodes 10, 24, may accept input as state information directly.

The input layer receives an input vector, with the output generated by each input node 10, 24, of the input layer being a representation of an observed state of a monitored entity, modified or otherwise. The size (number of nodes) of the input layer is determined by the number of states that the pattern needs to recognise, for example, if there were two entities to monitor, and three properties per entity, the state of any of which could contribute to the pattern, then six input nodes 10, 24 would be required in the input layer. Each input node 10, 24 has a memory module, whether it be a relay 16 or in some other form, to that every time an input to the input layer of the class network 1 changes, all input nodes 10, 24 'fire' and initiate diagnostic procedures (pattern recognition etc).

Each input node 10, 24, of the input layer is operable to output a representation of the current state of the monitored entity as a signal to each node 26 of the processing layer. At the processing layer, each node 26 is operable to combine and modify all or chosen subsets of values received from the input layer. The size of the processing layer is dependent upon the requirements of the problem for which the network is employed, for example, some problems may require few and simple combinations of received values, in which case the processing layer will be relatively small. On the other hand, some problems may only be detectable via satisfaction of a large number of conditions each requiring numerous combinations of received values, in which case the processing layer will be relatively large. The processing layer may alternatively be referred to as the hidden layer.

Each node 26 of the processing layer outputs a signal to each node 28 of the output layer. In the class network 1 of this particular embodiment, the output layer comprises a single node 28, which denotes the existence or not of a particular problem in the system of monitored entities 20. The additional class networks 1, 3 are each configured to generate in the output layer a signal denoting the existence or not of different problems in the system of monitored entities 20.

New monitored entities 20 can be added to the system. Depending on the particular implementation, this may or may not require retraining of the responsible class networks.

New class networks 1, 3, can be added to the artificial neural network 100 to diagnose new problems.

A temporal processor node 10 can be added to an existing class network 1, though this may require retraining of the class network. Conversely, a temporal processor node 10 can be removed from a class network and replaced with an input node 24. This may require an adjustment of weighting factors to reflect the steady state of the input node 24 when disregarding temporal relationships.

It is also possible to consider different configurations, depending on the nature of the system and the state information. For example, if one pattern involves the health status of all outgoing network connections from a specific node, instead of having one input node for each outgoing network connection, it would be possible to aggregate all such input nodes to one (e.g. using a simple logical aggregator) to denote failure of one or more of the outgoing network connections. Such neural network design decisions can be made depending on the nature of the environment and the patterns, the granularity and importance of individual states, and so on.

Figure 3:
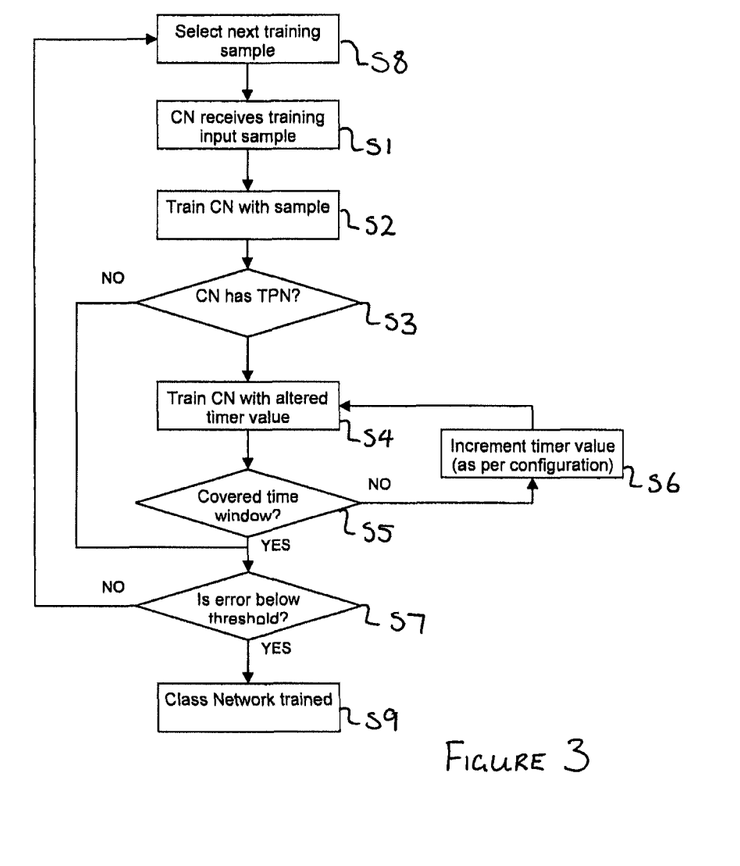
FIG. 3 is a flowchart of the operation of a class network of an embodiment in a training mode.

FIG. 3 is a flow chart of the operation of a class network in a training mode. In training mode, the nature and parameters of the modifications are set or adapted in order that the signal output by the class network in response to a training input sample matches, or is close within a threshold to, a known desired output associated with that particular training input sample. The setting and adaptation of the modifications may be achieved, for example, by a back error propagation procedure, though embodiments are not limited with respect to the precise training procedure employed.

At step S1 a training input sample is input to the class network 1, which receives the training input sample, with each input node 10, 24 of the input layer treating its allocated input from the training input sample as though it were a newly observed state of its respective monitored entity. The timers 16 of the one or more temporal processor nodes 10 are hence reset or initiated upon receipt of the training input sample.

At step S2, the training procedure is performed for the class network with the timers 16 of the temporal processor nodes 10 set to t=0. In this embodiment, the modifications performed at the nodes are multiplication of the observation of the current state, which may be represented by a value, by a weighting factor. At step S2, weighting factors for t=0 are set. In input nodes 24 other than temporal processor nodes, the weighting factor is not time-dependent, so the weighting factor set or adapted at S2 is the weighting factor for that node, regardless of elapsed time. Training involves some system of modifying weighting factors until the difference between the actual output and the desired output is either improved or removed. The precise system employed will depend on the precise implementation of the embodiment, and is not limiting on invention embodiments. For example, a back error propagation training routine may be used.

At step S3 it is assessed whether the class network being trained has any temporal processor nodes 10. It is noted that in embodiments of the present invention there should be at least one temporal processor node 10 in the artificial neural network 100. However, there may be class networks 3 within the artificial neural network 1 that do not contain temporal processor nodes 10. If there are no temporal processor nodes in the class network, then the flow proceeds to step S7.

If there are one or more temporal processor nodes 10 in the class network 1 then the flow proceeds to step S4, which represents the beginning of a temporal processor node training inner loop defined by steps S4-S6. Whilst performing this inner loop (steps S4-S6) the weighting factors applied to the non-TPNs in the CN remain fixed. Optionally, each temporal processor node in the class network is trained in this way in turn. The time window over which the temporal processor node is trained and the amount by which the timer value is incremented at step S6 is dependent upon the particular configuration of the embodiment. It may be that there is a time value at which the desired output of the class network changes, for example in a binary output class network, if t<30 s output=1; if t>30 s output=0. Therefore, since the nature of training is such that the modification values may change to reflect the output at around t=30 s, the time window may be 0-1 minute, with an increment of 5 s.

At step S7 an assessment is made of whether an error representing the accuracy and precision of the network is below a threshold value. Embodiments are not limited by the way in which the error is assessed or the threshold determined. In one example, training may be split into rounds of samples (training input vectors), and in a classification artificial neural network, the threshold is satisfied when the error is less than a threshold proportion of that round of samples, for example, less than 2 in 1000. In a recognition artificial neural network, the concept of rounds of samples may be used, but the threshold set as a noise ratio or correctness percentage. A further alternative is that the error is retained and constantly modified as an average or rolling average of errors across the samples used so far. On the basis that training often begins from a random set of modification or weighting factors, the average error should gradually decrease as training occurs, and the error should eventually drop below the threshold, at which point training is complete.

Once the class network has been trained using a particular sample, the same sample will be used in the inner training loop defined by steps S4 to S6 for each temporal processor node 10 in the class network in turn. Time passing is reflected by the modification factor of the modification module 14 changing at each time increment, and possibly by the desired output of the class network changing at a particular time or times. If, for example, two temporal processor nodes 10 exist in a particular class network 1, then each temporal processor node 10 should be trained in this way in turn.

Figure 4:
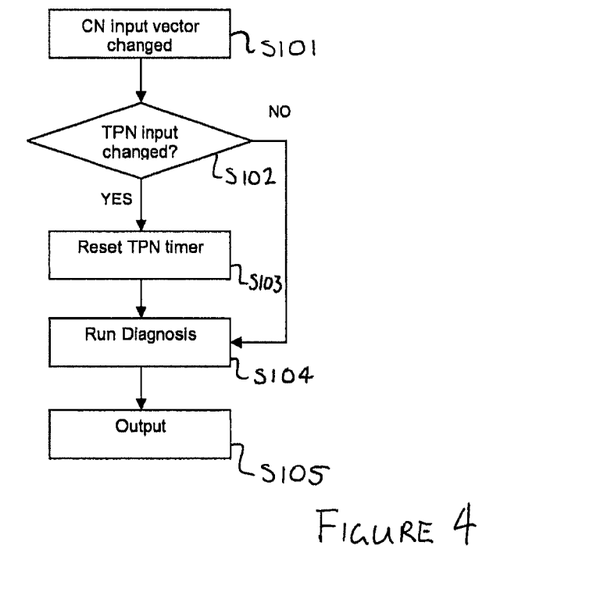
FIG. 4 is a flowchart of the operation of a class network of an embodiment in a recognition mode.

FIG. 4 is a flowchart representing the operation of a class network 1 embodying the present invention in a recognition mode. Recognition mode may be thought of as normal operation of a class network 1.

At step S101 a component of the network input vector is changed. The input nodes 10, 24, may monitor their respective components of the network input vector continuously or periodically in order to identify changes. When a change at any input node 10, 24, is identified, flow proceeds to step S102.

At step S102, it is assessed whether or not a component of the input vector received by a temporal processor node 10 has changed. If it has, then the flow proceeds to step S103. If not, then the flow proceeds to step S104.

At step S103, the timer 16 of each temporal processor node 10 at which components of the network input vector have changed is reset. This step occurs prior to the diagnosis step of S104, since the modification performed by the modification modules 14 of the temporal processor nodes 10 is dependent on the timer value. Therefore, the output signal from the output node 28 may be influenced by the timer 16 being reset.

At S104 the diagnosis is run. Diagnosis is the performance of the modifying, combining, receiving and outputting at each layer of the class network 1 which generates an output signal from the output node 28. At step S105, the output signal is output, which, in the problem diagnosis embodiment, is an indication of whether or not the change in the input vector is associated with the presence of a particular problem in the monitored system 20.

If the input node at which the received component of the input vector has changed is not a temporal processor node, diagnosis (pattern recognition) proceeds at step S104 with all non-temporal processor node input nodes 24 outputting their stored current state, and with all temporal processor nodes 10 having their outputs adjusted based on their respective timer values. If the timer value of a temporal processor node 10 at which the particular problem of the class network 1 will only be determined as present if that node observed a change within a time window, has exceeded the time window, then the output signal will indicate that the problem is not present.

Figure 5:
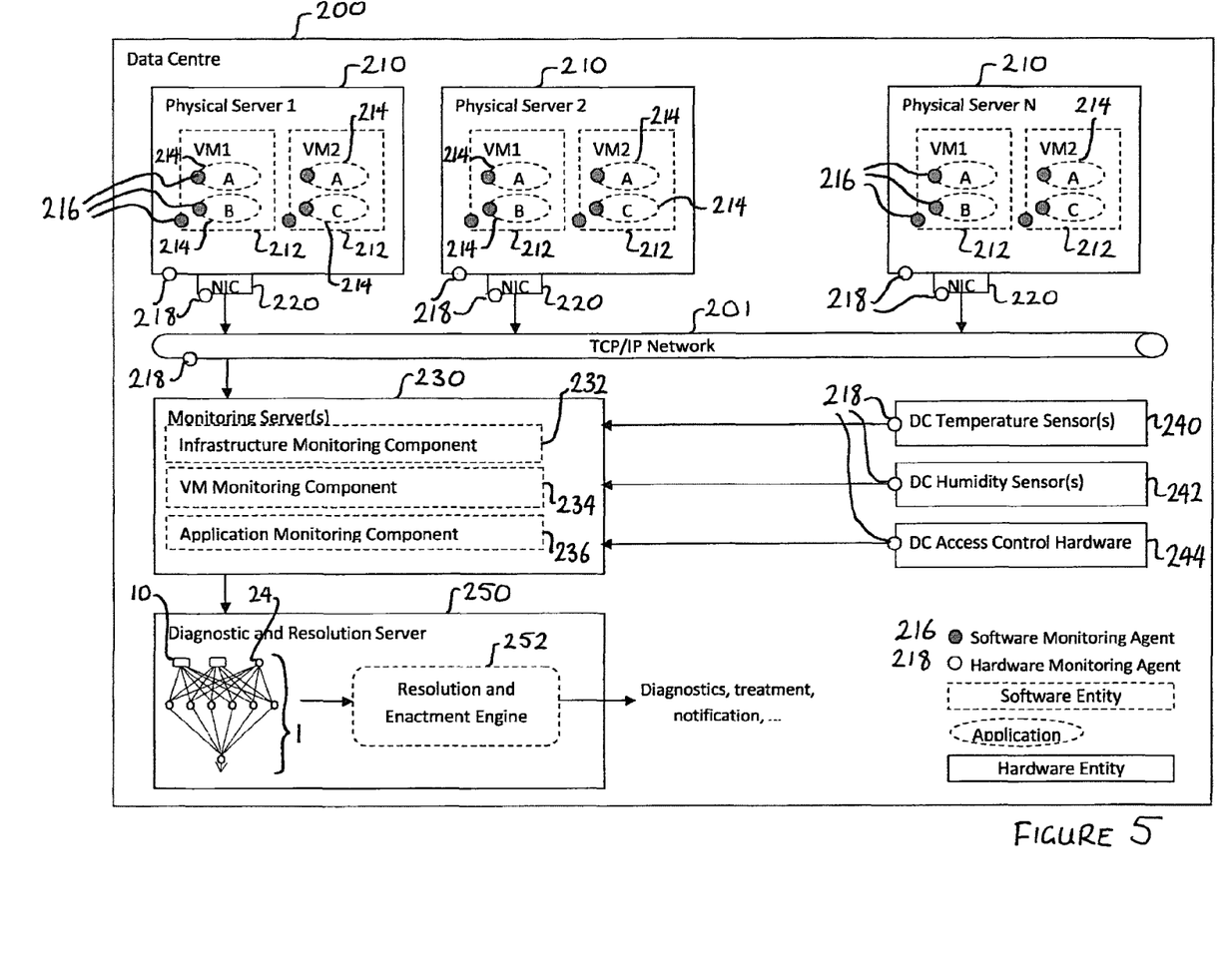
FIG. 5 is a diagram of an implementation example of an embodiment.

FIG. 5 is a diagrammatic representation of a system implementing an embodiment. The overall system being monitored is a data centre 200. The data centre 200 contains a plurality of physical servers 210, each having a network interface card 220 and connected via a TCP/IP Network 201. The data centre 200 also contains a monitoring server 230 (or group of monitoring servers 230), a DC temperature sensor 240, a DC humidity sensor 242, and DC access control hardware 244. A diagnostic and resolution server 250 is running an artificial neural network having a class network 1, and outputting diagnostics, treatment, and notification information.

Each physical server 210 is running one or more virtual machines 212. Each virtual machine 212 is running one or more applications A, B or C 214. Each physical server 210 and its network interface card 220 are monitored by respective hardware monitoring agents 218. Each virtual machine 212 and each application 214 run on the virtual machines are monitored by respective software monitoring agents 216. The TCP/IP network 201 which connects the physical servers 210 is also monitored by a hardware monitoring agent.

The state of the data centre 200 is monitored by one or more of each of DC temperature sensors 240, DC humidity sensors 242, and DC access control hardwares 244, each of which are monitored by a hardware monitoring agent 218. Each of the entities being monitored by software or hardware monitoring agents 216, 218 are monitored entities. The software and hardware monitoring agents 216, 218 are also connected via a network and are operable to send observation data representing the observed state of a monitored entity to the monitoring server 230. The monitoring server 230 receives the observation data and coordinates it for data centre control tasks with the infrastructure monitoring component 232, the VM monitoring component 234, and the application monitoring component 236, which are run as software entities. One of the tasks performed by the monitoring server 230 using its software entities is to output a network input vector to the diagnostic and resolution server 250 as an input to the class network 1. The network input vector contains data from one or more of the software and hardware monitoring agents 216, 218 as components.

One class network 1 is illustrated in FIG. 5 for ease of illustration, though it should be appreciated that an implementation such as that in FIG. 5 may include many more class networks. The class networks 1 may include one or more temporal processor nodes 10 in the input layer. The temporal processor node 10 can receive observation data representing the observed state of a monitored entity whose state with respect to time has a bearing on the output vector of the class networks 1. In a simple example, a particular class network 1 may be looking to identify network-wide hardware problems. It may be that if two physical servers 210 go down within a minute of one another, then it is identified that a network-wide problem exists. Therefore, the temporal processor nodes 10 receiving observation data representing the state of the physical servers 210 from the respective hardware monitoring agents 218 have been trained to give a high weighting (modification factor) to data representing "server down" for one minute after it has been received, then to gradually decrease the modification weighting thereafter. Other factors in that class network may not be temporally dependent, and may therefore feed into an input node 24 other than a temporal input node 10.

An output signal generated by the class network 1 is then fed into a resolution and enactment engine so that the processes of diagnostics, treatment, and notification of relevant parties may begin.

The invention claimed is:

1. A temporal processor node for use as an input node in the input layer of a class network in an artificial neural network, the class network being operable to generate an output signal based on a network input vector component received by the input layer, the temporal processor node being operable to receive observation data representing the observed state of a monitored entity as a component of the network input vector, the temporal processor node comprising:
   a memory module operable to store a most recently observed state of the monitored entity in the memory module as a current state;
   a modification module having a timer, the timer being operable to output a value representing time elapsed since observation of the current state, the modification module being operable to modify the current state with a modification factor dependent on the value output by the timer; wherein
   when triggered, the temporal processor node is operable to output the modified current state as a representation of the current state.

2. An artificial neural network having a class network, the class network operable to generate an output signal based on a network input vector received by an input layer of the class network, the class network comprising:
   a plurality of input nodes forming the input layer, each input node having a memory module and being operable to receive observation data representing the observed state of a monitored entity as a component of the network input vector, to store a most recently observed state of the monitored entity in the memory module as a current state, and, when triggered, to output a representation of the current state; wherein
   one or more of the plurality of input nodes is a temporal processor node according to claim 1.

3. The artificial neural network according to claim 2, wherein
the class network is operable to function in a training mode, in which
the input layer is operable to receive a training input vector as a network input vector with sample states of monitored entities as components for treatment as observed states of monitored entities in the input nodes, and
the modification factor for each of a plurality of values of elapsed time is set for each temporal processor node.

4. The artificial neural network according to claim 3, wherein each time a training input vector is received:
the training procedure is performed with the timers of the one or more temporal processor nodes outputting an elapsed time of zero;
and for each temporal processor node, the training procedure is performed with the timer of the temporal processor node outputting each of a plurality of values of elapsed time.

5. The artificial neural network according to claim 4, wherein
the class network is operable to function in a recognition mode, in which
when a component of the network input vector changes, the plurality of input nodes forming the input layer are triggered and are each operable to output a representation of the current state, and
if the input node at which the received component of the network input vector has changed is a temporal processor node, the timer of that temporal processor node is reset.

6. The artificial neural network according to claim 5, the class network further comprising:
a processing layer including a plurality of processing nodes operable to receive one or more representations of current states from the input layer, and to combine and modify the received representations to output as a processed signal; and
an output layer, operable to receive processed signals from one or more processing nodes and to combine and modify the received processed signals to output as the output signal.

7. The artificial neural network according to claim 6, wherein the monitored entities whose states are observed belong to a system, and the class network is operable to generate a decision on whether or not a particular problem has occurred in the system based on the network input vector.

8. The artificial neural network according to claim 7, further comprising one or more additional class networks, each additional class network being operable to generate a decision on whether or not a different particular problem has occurred in the same system based on a network input vector.

9. A method for generating an output signal from a network input vector received by an input layer in a class network forming part of an artificial neural network, the class network comprising a plurality of input nodes forming the input layer, each input node having a memory module, wherein one or more of the input nodes are temporal processor nodes, each comprising a modification module having a timer,
the method comprising:
at each of the input nodes, receiving observation data representing the observed state of a monitored entity as a component of the network input vector, and storing a most recently observed state of the monitored entity in the memory module as a current state, and, when triggered, outputting a representation of the current state; and
at each of the temporal processing nodes, the method further comprises:
outputting a value from the timer representing time elapsed since observation of the current state;
modifying the current state with a modification factor dependent on the value output by the timer; and
when triggered, outputting the modified current state as the representation of the current state.

10. The method according to claim 9, further comprising, in a training mode of the class network:
inputting to the input layer as a network input vector, a training input vector with sample states of monitored entities for treatment as observed states of monitored entities in the input nodes;
for each training input vector, resetting each of the timers when the training sample is received, and for each of a plurality of values of elapsed time, performing a training procedure to define a modification factor for each temporal processor node.

11. The method according to claim 10, further comprising, in a recognition mode of the class network:
when a component of the network input vector changes, triggering each of the plurality of input nodes forming the input layer to output a representation of the current state, and
if the input node at which the received component of the network input vector has changed is a temporal processor node, resetting the timer.

* * * * *

UNITED STATES PATENT AND TRADEMARK OFFICE
CERTIFICATE OF CORRECTION

PATENT NO. : 8,892,486 B2
APPLICATION NO. : 13/348130
DATED : November 18, 2014
INVENTOR(S) : Stavros Isaiadis Page 1 of 1

It is certified that error appears in the above-identified patent and that said Letters Patent is hereby corrected as shown below:

On the Title page, Item [54] and in the Specification, column 1, line 2, (Title), After "METHOD" insert -- OF --.

Signed and Sealed this
Twenty-first Day of July, 2015

Michelle K. Lee
*Director of the United States Patent and Trademark Office*